Jan. 20, 1970   W. E. GRUNSTEIDL   3,491,059
HEAT CURABLE EPOXY COMPOSITIONS WITH CURING AGENT
1-AMINO-3-AMINOMETHYL-3,5,5-TRIMETHYLCYCLOHEXANE
Filed March 20, 1967
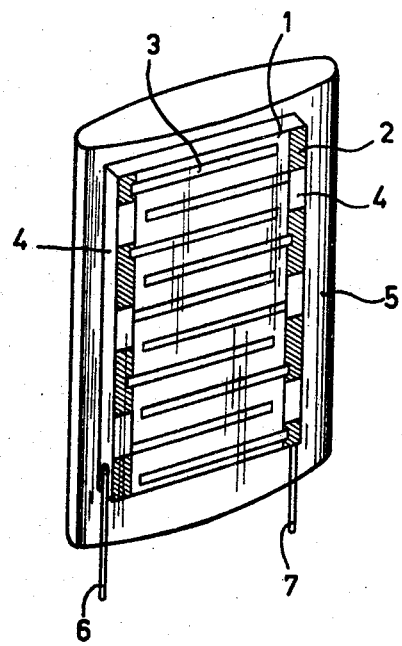
INVENTOR.
WALTER E. GRUNSTEIDL
BY
AGENT United States Patent Office 3,491,059
Patented Jan. 20, 1970

3,491,059
HEAT CURABLE EPOXY COMPOSITIONS WITH CURING AGENT 1-AMINO-3-AMINOMETHYL-3,5,5-TRIMETHYLCYCLOHEXANE
Walter Edmund Grunsteidl, Emmasingel, Eindhoven, Netherlands, assignor, by mesne assignments, to U.S. Philips Corporation, New York, N.Y., a corporation of Delaware
Filed Mar. 20, 1967, Ser. No. 624,531
Claims priority, application Netherlands, Mar. 18, 1966, 6603536
Int. Cl. C08g 45/00
U.S. Cl. 260—47                    1 Claim

ABSTRACT OF THE DISCLOSURE

Heat curable epoxy compositions containing an epoxy compound containing more than one epoxy group per molecule and as a curing agent 1-amino-3-aminomethyl-3,5,5-trimethycyclohexane. The mixture cures to, and remains in the B stage at room temperature up to several months. The cured mixture is rapidly converted to the infusible stage by heating (120–140° C.) and is colorless at the B stage or at the infusible stage. An example of the epoxy compound is a polyglycidyl ether of 4,4-dihydroxydiphenylol-2,2-propane. This abstract is not intended to be a description of the invention defined by the claims.

---

This invention relates to the production of a heat-curable mixture containing, as a curable constituent, a compound having on an average more than one epoxy group per molecule and as a curing agent an alicyclic, primary diamine.

For the production of lacquers from a compound having on an average more than one epoxy group per molecule it has been proposed to use as a curing agent a diaminocyclohexane which may be substituted in the ring by hydrocarbon radicals.

In the presence of these curing agents, curing occurs however after the evaporation of the solvent at room temperature.

It has furthermore been proposed to cure polyglycidyl ethers of arylamines and polyhydroxyphenyl compounds by means of 1-amino-4-aminomethylcyclohexane compounds, in which the hydrogen atom at the carbon atom at the 1-position and one or both hydrogen atoms at the carbon atom of the aminomethyl-group may be replaced by alkyl-groups having 8 carbon atoms at the most, preferably, however, by a methyl-, ethyl- or propyl-group, for example, 1,8-diaminoparamenthane. These alicyclic amines have the advantage that they are, in general, liquid at room temperature. Reactive mixtures, according to this proposal, however, have a pot life of only 24 hours.

According to my invention, I have found a particularly suitable curing agent for polyepoxides: 1-amino-3-aminomethyl-3,5,5-trimethylcyclohexane. I have found that the use of this diamine as a curing agent for polyepoxides, compounds containing more than one epoxy group, per molecule presents several advantages which, as far as is known, are not obtained by means of the alicyclic diamines known for this purpose.

These advantages are, in particular:

(1) After mixing with a liquid or molten polyepoxide in an equivalent ratio, that is to say, in a ratio such that for each epoxy-group one hydrogen atom bound to nitrogen is available, a fusible, soluble product is formed spontaneously at room temperature within a comparatively short period of time, usually within two hours, which product is in a B-stage. The mixture in the B stage has a pot-life of several days up to several months. However, when heated, for example at 120 to 140° C. the mixture is very rapidly completely hardened.

(2) After the mixture has reached the B stage the initially yellowish or brownish polyepoxides are found to be decolorized. Even after curing and heating for a longer time at 140° C. the resultant products remain clear as glass.

(3) In general, it is necessary that in order to attain a given heat distortion temperature epoxy resins should be cured at a temperature equal to the heat distortion temperature to be attained at a temperature higher than this distortion temperature. The use of the hardening agent of my invention permits the attaining heat distortion temperatures exceeding the curing temperature.

(4) Without a filling substance in the mixture the shrinkage is found to be very low, that is to say 0.2 to 0.3% after curing.

In carrying out my invention the curing agent is preferably used in stoichiometric quantities, that is to say in a quantity such that for each epoxy group one active hydrogen atom bound to nitrogen is available in the mixture. However, good results are also obtained with a slight excess quantity or a slight shortage of the curing agent.

The curing agent of my invention has the advantage that at room temperature (15° C.) it is a liquid, so that it can be thoroughly mixed with liquid and molten polyepoxides. Moreover, the viscosity of the polyepoxide is temporarily reduced thereby. This means that filling substances can be very readily introduced in comaparatively large quantities and that moulding mixtures can be very effectively degassed in vacuo. The curing agent is soluble practically without restriction in solvents commonly used for dissolving polyepoxides so that also lacquers can be produced when using this curing agent.

The polyepoxides may consist for example of polyglycidyl ethers of mono- or multi-nuclear, aromatic compounds containing phenolic hydroxyl-groups such as the polyglycidyl ethers of diphenylolpropane, cresol-and phenol novolaks or the polyglycidyl ethers of polyglycols. Furthermore, cycloaliphatic epoxy resins may be used. Accelerating agents such as tertiary amines and combinations thereof with phenolic hydroxyl-containing compounds may be used to accelerate the reaction of epoxy resin and 1-amino-3-aminomethyl-3,5,5-trimethylcyclohexane.

The excellent optical properties of the products obtained by means of 1-amino-3-aminomethyl-3,5,5-trimethylcyclohexane permit employing moulded masses produced by the method according to my invention is particularly useful in those cases in which limpidity and freedom of color are required, for example in fixing photocells by casting. For this purpose the epoxy-resin-containing cast resins cured with the aromatic and aliphatic amines hitherto used are less suitable due to the yellow or brownish color or the cured products, which cause absorption of blue light.

Moulding compositions may be prepared by the addition of filling substances, reinforcing material such as short glass fibers, pigments, releasing agents and other substances, for example, accelerating agents.

After the moulding composition has attained the B-stage, it can be ground. The resultant moulding powder has at room temperature a fairly long pot-life for example one month. Stored at a lower temperature, for example at 5° C., the material has a pot-life of several months.

It is thus possible to produce moulding masses which have a particularly low viscosity during the compressive phase, for example, at a temperature of 160° C., so that they can be injected into a mould under a low pressure by for example, transfer moulding. After the mould is filled, the mass cures completely within a few minutes. Such a moulding mass is also particularly suitable for enveloping small electrical and electronic parts (diodes, transistors and the like) by a transfer moulding process.

Liquid reactive mixtures according to the invention may be employed for impregnating glass tissue or glass mats, which are put on a jig (hand lay-up method). If desired several layers may be stacked one on the other and the assembly can be brought to the B-state at room temperature. Then the assembly is introduced into a furnace and cured at about 120° C. to 130° C. First the resin constituent melts, so that an improved impregnation of the glass fibres is obtained. After about two hours the assembly has cured completely.

If desired, the resin curing agents mixture may be caused, after impregnation, to pass first to the B stage, before several of such layers of impregnated glass tissue or mat are laid upon each other and cured together to form a laminate.

The curing agent according to the invention is particularly appropriate for use in the curing of polyepoxides for the continuous impregnation of glass rovings in the filament winding process.

Epoxy resins are well known, commercially available materials, the properties and synthesis of which are described, inter alia, in United States Patents 2,324,483; 2,444,333; 2,500,600 and 2,716,099. These disclosures are incorporated herein by reference and form a part of the description of the epoxy resins, which may be used in the practice of this invention.

My invention will now be described in greater detail with reference to the following examples:

EXAMPLE 1

180 g. of polyglycidyl ether of 4.4-dihydroxy-diphenylol-2,2-propane (epoxy equivalent about 180) were mixed with 42.5 g. of 1-amine-3-aminomethyl-3,5,5,-trimethyl-cyclohexane. In a jig, plates of a thickness of about 3 mms. (20 x 20 cms.) were cast. After two hours at room temperature the resin had passed to a brittle, fusible B stage. The plates could then be removed from the jig. The initially yellow mixture had become completely colorless. Strips of a width of 2 cms., sawed from the plates, were cured at different temperatures, after which the heat distortion temperature was determined. The following was found:

| Curing during— | ° C. |
|---|---|
| 2 hours at 120° C., resulted in a HDT (heat distortion temperature) | 133–134.5 |
| 2 hours at 130° C. | 139–140 |
| 2 hours at 140° C. | 139–140 |
| 2 hours at 150° C. | 135–136 |

EXAMPLE 2

From a curing agent mixture of a composition as given in Example 1, plates (20 x 20 x 0.3 cms.) were cast, which were heated, after three hours at room temperature, for one hour at 100° C., then for 2 hours at 120° C. and for 2 hours at 150° C.

The plates showed the following properties:

Linear shrinkage upon setting: 0.27%
Bending strength: 1140 kgs./cm.$^2$
Impact value: 18.9 kg. cm./cm.$^2$
Tan δ (1.5 mc./s.): 322.10$^{-4}$
Dielectric constant (1.5 mc./s.): 3.36
Heat distortion temperature: 142° C.
Water absorption in water of 100° C. (for 24 hours): 1.54% by weight, at 25° C. (for 24 hours): 0.14% by weight

EXAMPLE 3

180 g. of a polyepoxide produced from bisphenol A and epichlorohydrine (epoxy equivalent about 180) were mixed with 42.5 g. of 1-amino-3-aminomethyl-3,5,5,-trimethylcyclohexane as in Example 1. On a pan roller 100 g. of aluminum oxide powder and 100 g. of zinc stearate were mixed with the resin-curing agent mixture. The mixture was poured out on a flat plate. After 2 hours at room temperature the mixture had become hard and brittle. It was ground to a fine powder. In a mould plate (8 x 8 x 0.3 cms.) were pressed said powder at 160° C. for 5 minutes (pressure 20 kgs./cm.$^2$).

The plates showed the following properties:

Bending strength: 798 kgs./cm.$^2$
Surface resistance: 10$^{13}$ ohms (after 24 hours in water)
Internal resistance: 10$^{13}$ ohms (after 24 hours in water)
Tan δ (1.5 mc./s.): 299.10$^{-4}$
dielectric constant (1.5 mc./s.): 3.77
Heat distortion temperature: 126° C.
Water absorption in water of 100° for 24 hours: 1.14% by weight in water of 25° C. for 20 hours: 0.099% by weight

EXAMPLE 4

A glass tissue of the HG28 type (linen binding 100 g. per m.$^2$), finished with γ-aminopropylsilane was impregnated with a mixture of 180 g. of the polyepoxide resin of Example 1 with 42.5 g. of 1-amino-3-aminomethyl-3,5,5,-trimethylcyclohexane. After one and a half hours at 25° C. the impregnated glass tissue was dry and non-sticking; the resin content was 70% of the total weight. Eight sheets of the impregnated glass tissue (dimensions 20 x 30 cms.) were laid up in a press and compressed under a pressure of about 20 kgs./cm.$^2$ for 15 minutes, at a temperature of 120° C.

The laminated structure thus obtained showed the following properties:

Surface resistance after 4 hours at 70° C. more than 10$^{14}$ ohms
Internal resistance after 4 hours at 70° C. more than 10$^{14}$ ohms
Surface resistance after 24 hours in water of 25° C.: 3.10$^{13}$ ohms
Internal resistance after 24 hours in water of 25° C.: 2.10$^{12}$ ohms
Tan δ (1.5 mc./s.) after 4 hours at 70° C.: 295.10$^{-4}$
Dielectric constant (1.5 mc./s.) after 4 hours at 70° C.: 3.66
Tan δ (1.5 mc./s.) after 24 hours in water of 25° C.: 318.10$^{-4}$
Dielectric constant (1.5 mc./s.) after 24 hours in water of 25° D 3.77
Increase in weight after 24 hours in water of 25° C.: 0.03%

EXAMPLE 5

106 g. of a commercially available polyepoxide consisting of a polyglycidylether of a novolak (epoxy equivalent 170) was mixed with 25 gs. of 1-amino-3-amino methyl-3,5,5-trimethylcyclohexane. Test plates of this mixture were heated at 100° for one hour and then at 130° for 2 hours. The bending strength after this hardening step was 1260 kgs./cm.$^2$

EXAMPLE 6

In the sole figure in the drawing a photocell consisting of a body 1 of cadmium sulfide provided at the edges with electrical conducting strips 2 of silver and in contact therewith electrical conducting strips 3 of gold, obtained by vapordeposition and two electrodes 4 provided with leads 6 and 7 was placed in a mould. The mould was filled with the resin mixture according to Example 1. The resin was cured, by heating the mould at a temperature of 120° C. for one hour. A colorless moulding 5 was obtained. Under damp conditions no leakage of water along the leads 6 and 7, which could destroy the photocell in question, was observed. By adding dyestuffs to the resin mixture the photocell in question may be made selective for a desired part of the spectrum of light.

While I have described my invention in connection with specific embodiments and applications, other modifications thereof will be readily apparent to those skilled in this art without departing from the spirit and scope of the invention as defined in the appended claims.

What I claim is:

1. A heat-curable mixture containing, as a curable constituent, a polyepoxide having more than one oxirane group per molecule and, as a curing agent, 1-amino-3-aminomethyl-3,5,5-trimethylcyclohexane.

References Cited
UNITED STATES PATENTS 3,321,438  5/1967  Brooker et al.
3,367,911  2/1968  Daum et al.

HAROLD D. ANDERSON, Primary Examiner

T. PERTILLA, Assistant Examiner

U.S. Cl. X.R.

117—124, 126; 161—185; 260—2, 37, 59

PO-1050
(5/69)

UNITED STATES PATENT OFFICE
CERTIFICATE OF CORRECTION

Patent No. 3,491,059 (PHN 1490) Dated January 20, 1970

Inventor(s) WALTER EDMUND GRUNSTEIDL

It is certified that error appears in the above-identified patent and that said Letters Patent are hereby corrected as shown below:

Column 4, line 23, "100g" should read -- 200 g --.

Signed and sealed this 25th day of August 1970.

(SEAL)
Attest:

Edward M. Fletcher, Jr.
Attesting Officer

WILLIAM E. SCHUYLER, JR.
Commissioner of Patents